United States Patent
Bhadbhade et al.

(10) Patent No.: US 9,715,497 B1
(45) Date of Patent: Jul. 25, 2017

(54) EVENT DETECTION BASED ON ENTITY ANALYSIS

(71) Applicant: AMAZON TECHNOLOGIES, INC., Reno, NV (US)

(72) Inventors: Tanvi Milind Bhadbhade, Seattle, WA (US); Divya Mahalingam, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 557 days.

(21) Appl. No.: 14/090,507

(22) Filed: Nov. 26, 2013

(51) Int. Cl.
   *G06F 17/28* (2006.01)

(52) U.S. Cl.
   CPC .................. *G06F 17/28* (2013.01)

(58) Field of Classification Search
   CPC ...... G06F 17/229; G06F 17/278; G06F 17/21; G06F 17/211; G06F 17/218; G06F 17/241; G06F 17/2745; G06F 17/30011; G06F 3/0483; G06F 17/28
   See application file for complete search history.

(56) References Cited

U.S. PATENT DOCUMENTS

| | | | | |
|---|---|---|---|---|
| 5,734,916 | A * | 3/1998 | Greenfield | G06F 17/22 434/118 |
| 7,120,642 | B2 * | 10/2006 | Hsu | G06F 17/2705 |
| 7,333,967 | B1 * | 2/2008 | Bringsjord | G06N 5/00 706/45 |
| 2007/0294305 | A1 * | 12/2007 | Cohen | G11B 27/034 |
| 2010/0180213 | A1 * | 7/2010 | Karageorgos | G06F 17/30011 715/753 |
| 2012/0078612 | A1 * | 3/2012 | Kandekar | G06F 17/2745 704/9 |
| 2015/0012562 | A1 * | 1/2015 | Hu | G06F 17/30699 707/769 |

* cited by examiner

*Primary Examiner* — Wilson Tsui
(74) *Attorney, Agent, or Firm* — Lindauer Law, PLLC

(57) ABSTRACT

Techniques are described for analyzing a submitted manuscript through the use of an entity/action relationship matrix determined for the manuscript. The entity/action relationship matrix may describe one or more entities, such as characters, locations, objects and so forth, which are identified in the manuscript using a natural language analysis such as a part-of-speech analysis. The entity/action relationship matrix may also describe actions or events associated with each of the entities, as determined using the natural language analysis. The entity/action relationship matrix may be employed to determine whether the manuscript complies with rules constraining the use of entities in the manuscript.

20 Claims, 10 Drawing Sheets

ENTITY/ACTION RELATIONSHIP MATRIX
120

| ENTITY 202(1) (E.G., CHARACTER, LOCATION, NAMED OBJECT, ETC.) | ACTION 204(1) POSITION INDICATOR 206(1) | ACTION 204(2) POSITION INDICATOR 206(2) | ACTION 204(3) POSITION INDICATOR 206(3) | ... |
|---|---|---|---|---|
| ENTITY 202(2) | ACTION 204(4) POSITION INDICATOR 206(4) | ... | | |
| ENTITY 202(3) | ENTITY METADATA 210 (E.G., AGE, GENDER, APPEARANCE, ETC.) | ACTION 204(5) POSITION INDICATOR 206(5) | ACTION 204(6) POSITION INDICATOR 206(6) | ... |

⋮

| "Tom Walker" | "fought bravely" (paragraph 12) | "slept" (paragraph 137) | "is scared" (paragraph 154) | "struggled bravely" (paragraph 12) |

⋮

EXAMPLE ROW 208

FIG. 2

EVENT DETECTION BASED ON ENTITY ANALYSIS

BACKGROUND

Given the growing popularity of mobile computing devices configured to present electronic books or other digital content, device providers or content providers may seek new sources of content presentable on mobile computing devices. To satisfy customer demand for content, content providers have created direct publishing or self-publishing models that enable authors or publishers to submit content such as an electronic book for publication. The submitted content may be made available for purchase by customers and for download to a mobile computing device. The submitted content may be reviewed to determine whether it is suitable for publication. In some cases, the review of submitted content may consume a substantial amount of time and resources.

BRIEF DESCRIPTION OF THE DRAWINGS

FIG. 2 depicts a schematic of an example entity/action relationship matrix.

Figure 1:
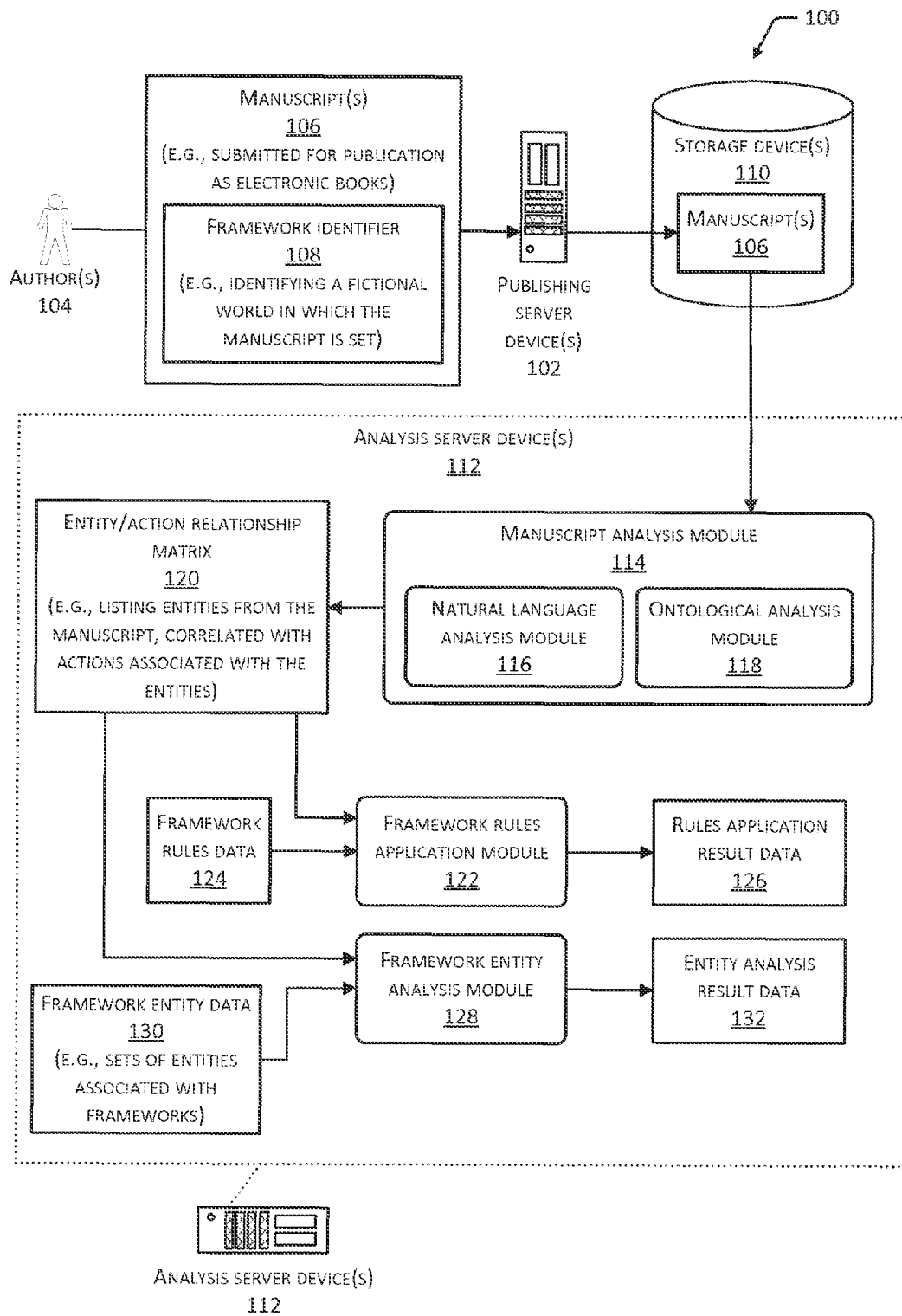
FIG. 1 depicts an environment for analyzing manuscripts to generate an entity/action relationship matrix that describes entities present in the manuscript and actions associated with the entities, and for employing the entity/action relationship matrix to analyze the manuscript in view of a framework.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for determining an entity/action relationship matrix that describes entities present in a manuscript and actions or events associated with the entities. The entity/action relationship matrix may be employed to analyze the manuscript in view of a framework, and to determine whether to publish the manuscript. A framework may be a setting, world, universe, mythology, or milieu created in or otherwise associated with one or more creative works of fiction, such as one or more books, plays, poems, songs, other types of literary works, films, television shows, games, other types of audio-visual or graphical works, or other works. As such, a framework may include one or more entities that have been presented within previously published works of that framework. Such entities may include characters, locations, and objects that were previously introduced in the previously published works of a framework. For example, a framework may have been created within a series of books that present stories regarding a set of entities such as characters, objects, or locations that are particular to or original to the framework in which the books are set. Entities may include named entities such as proper nouns.

In some cases, an author, a publisher, a licensor, or some other owner of the copyrights to the framework may open up the framework to enable other authors to create original works that are set within the framework or that are otherwise derivative of the framework. In such cases, the rights owner may provide a set of rules governing how the entities within the framework may be used in the newly created works. For example, the rights owner may provide a rule indicating that a particular character may not die or that a particular object may not be destroyed. The rules may also more broadly constrain the use of the framework. For example, the rights owner may provide a rule indicating that there may be no violence or explicit romantic content presented in works that are set within the framework. When works associated with the framework are submitted for publication as electronic books (eBooks) or other types of media, the works may be examined to determine whether they comply with the set of rules governing of the use of entities in the relevant framework.

Implementations enable the examination of submitted manuscripts through the use of an entity/action relationship matrix that is generated through an analysis of the manuscript. In some implementations, a submitted manuscript may undergo a natural language analysis to identify entities within the manuscript. Such entities may include characters, locations, objects, concepts, or any other proper nouns that appear in the manuscript. For example, the natural language analysis may determine that the manuscript includes a character named "Tom Walker" and a location named "Perigord University." The natural language analysis may also identify any actions or events that are performed by, performed on, or otherwise associated with the entities. For example, the natural language analysis may determine that the entity "Tom Walker" is associated with an action "fought bravely," based on an analysis of the sentence "Tom Walker fought bravely" in the manuscript. As another example, the natural language analysis may determine that "Tom Walker" is associated with an action "died" in the manuscript, based on the manuscript including a description of an event "Tom Walker died." The entity/action relationship matrix may describe each of the entities identified in the manuscript, and zero or more actions that are associated with each of the entities. In some implementations, the entity/action relationship matrix may be a two-dimensional matrix arranged into rows and columns. In such implementations, each row may correspond to a particular entity, and the first column of a row may include the entity for that row. Subsequent columns in a row may list the actions associated with the entity for the row.

In some implementations, the natural language analysis to identify entities and actions may include a part-of-speech (POS) analysis to identify the parts of speech of particular words or word phrases in the manuscript, such as whether a word is a noun, verb, adjective, and so forth. The natural language analysis may also include a semantic analysis to identify semantic relationships between words in the manuscript, such as a noun-verb (e.g., noun performs verb) or a noun-adjective (e.g., adjective describes noun) relationship between words. Implementations may employ any natural language processing algorithm to perform the natural language analysis. In some implementations, the natural language analysis may be performed using the Natural Language Processing software provided by the Stanford Natural Language Processing Group, of Stanford, Calif., USA. The natural language analysis may include POS tagging, entity recognition, word segmentation, parsing, tokenization, or other operations. The natural language analysis may include statistical, stochastic, or probabilistic analysis techniques. In some cases, the natural language analysis may employ supervised or unsupervised machine learning techniques.

In some implementations, the entity/action relationship matrix may be modified to include additional actions that are synonyms for at least some of the actions determined based on the natural language analysis of the manuscript. For example, a column may include the action "fought bravely" in the row associated with the entity "Tom Walker." In such cases, an additional column may be added to the row, the additional column including the action "struggled bravely." Such expansion of the entity/action relationship matrix may be based on information included in a database of words, phrases, and ontological relationships between various words and phrases (e.g., synonyms, antonyms, and so forth). For example, the expansion of the entity/action relationship matrix may employ information from the WordNet® database. In some implementations, the entity/action relationship matrix may be modified to remove duplicate entities or duplicate actions associated with an entity.

The entity/action relationship matrix for a manuscript may be employed to determine whether the manuscript substantially complies with one or more rules that constrain the use of entities in a framework, or that constrain the use of the framework generally. In some cases, a submitted manuscript may be rejected for publication if it uses one or more entities in a manner that is non-compliant with the rules governing the framework. In some implementations, the entity/action relationship matrix may also be employed to determine whether a manuscript includes a large proportion of entities (e.g., above a threshold proportion) that are outside its framework, or cross-over entities that are associated with other frameworks. In either case, the submitted manuscript may be rejected for publication. Such rejection may be automatic. Alternatively, the non-compliant sections of the manuscript may be flagged for further, manual review by editors, reviewers, or other personnel.

FIG. 1 depicts an environment 100 for analyzing manuscripts to generate an entity/action relationship matrix that describes entities present in the manuscript and actions associated with the entities, and for employing the entity/action relationship matrix to analyze the manuscript in view of a framework. As shown in FIG. 1, the environment 100 may include one or more publishing server devices 102. The publishing server device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the publishing server devices 102 may comprise a cluster, cloud, farm, or other grouping of multiple devices that coordinate operations to provide load balancing, failover support, parallel processing capabilities, shared storage resources, or other aspects.

In some cases, the publishing server device(s) 102 may provide a direct publishing or self-publishing service. Accordingly, one or more authors 104 may interact with the publishing server device(s) 102 to submit one or more manuscripts 106 for publication. The manuscript(s) 106 may include any type of content. In some cases, the manuscript(s) 106 may be works of fiction or non-fiction writing. The manuscript(s) 106 may also include other types of works, such as games, music, audio-visual content, and so forth. The manuscript(s) 106 may include content in any format. In some cases, the manuscript(s) 106 may be submitted in a digital format such as the Portable Document Format (PDF) provided by Adobe Systems, Inc. of San Jose, Calif., USA. In some cases, the manuscript(s) 106 may be submitted to the publishing server device(s) 102 for publication as eBook(s). Although FIG. 1 depicts the manuscript(s) 106 being submitted by the author(s) 104 (e.g., the creators of the manuscript(s) 106), implementations are not so limited. In some cases, the manuscript(s) 106 may be submitted by publishers, licensors, or other parties who, in whole or in part, own copyrights to the submitted manuscript(s) 106.

In some cases, the publishing server device(s) 102 may provide a self-publishing or direct publishing service for those author(s) 104 who create new manuscript(s) 106 that are based in, or in some way derived from, an existing framework. As described above, the framework may be a world, setting, universe, mythology, or milieu that has been established in one or more previously published works that have been made available to the public. Such previously published works may include one or more of the following: previously published books; previously aired, broadcast, or streamed television shows; previously distributed or streamed films; previously distributed, published, or released games; or any other type of content made available to the public. In some cases, previously published works may include works that are completed and made available to the author(s) 104, prior to being made available to the public. In some implementations, the submitted manuscript(s) 106 may include a framework identifier 108 that identifies a framework associated with the manuscript(s) 106, e.g., a framework in which the manuscript(s) 106 are set. The framework identifier 108 may uniquely identify a framework using a framework name, framework identification number, or any other type of identifying information.

In some implementations, the publishing server device(s) 102 may store the submitted manuscript(s) 106 in one or more storage device(s) 110. The storage device(s) 110 may comprise any type of data storage system or datastore, and may be a relational or a non-relational datastore. Implementations support any type or format of data storage for the storage device(s) 110, including but not limited to a database, an array, a structured list, a tree, a key-value storage, flat files, unstructured data, or any other data structure or format.

The environment 100 may include one or more analysis server devices 112. The analysis server device(s) 112 may comprise any type of computing device, including but not limited to those types of computing device listed above with reference to the publishing server device(s) 102. The analysis server device(s) 112 are described further with reference to FIG. 5. In some cases, two or more of analysis server devices 112 may comprise a cluster, cloud, farm, or other grouping of multiple devices that coordinate operations to provide load balancing, failover support, parallel processing capabilities, shared storage resources, or other aspects.

The analysis server device(s) 112 may execute a manuscript analysis module 114 which is configured to access and analyze the manuscript(s) 106. In some implementations, the manuscript analysis module 114 includes one or both of a natural language analysis module 116 and an ontological analysis module 118. The natural language analysis module 116 may perform a natural language analysis, such as a POS analysis, on one or more sections of the manuscript(s) 106 to identify entities (e.g., characters, objects, or locations) described in the manuscript(s) 106. The natural language analysis may also identify one or more actions or events that are performed by, performed on, experienced by, or otherwise associated with one or more of the identified entities. As described above, the manuscript analysis module 114 may generate an entity/action relationship matrix 120 that lists the entities in the manuscript(s) 106, and lists zero or more actions associated with each of the entities. Operations of the manuscript analysis module 114, the natural language analysis module 116, and the ontological analysis module 118 are described further with reference to FIGS. 6 and 7.

FIG. 2 depicts a schematic 200 of an example of the entity/action relationship matrix 120. In the example shown, the entity/action relationship matrix 120 is a two dimensional matrix with rows corresponding to entities 202. Each row includes a first column that identifies the entity 202 corresponding to that row. Each row includes zero or more columns that each describe an action 204 associated with the corresponding entity 202 for that row. In some implementations, the columns may also include a position indicator 206 corresponding to at least some of the actions 204. The position indicator 206 may indicate a position or location at which the action 204 is described in the manuscript 106. The position indicator 206 may be a chapter or section number, page number, paragraph number, line number, word number, or character number that indicates a position of the action 204 in the manuscript 106. The position indicator 206 may also describe the position using other types of indicators. In some implementations the position indicator 206 may indicate a percentage of the manuscript 106 after which the action 204 is described. For example, a position indicator 206 of 50% may indicate that the action 204 is described at or substantially near the halfway point of the manuscript 106. Implementations may include a position indicator 206 for all of the actions 204, some of the actions 204, or none of the actions 204.

In some cases, one or more of the actions 204 may be additional actions that are synonyms, or that are otherwise ontologically similar, to other action(s) 204. Such additional action(s) 204 may be added to the entity/action relationship matrix 120 through operations of the ontological analysis module 118. By incorporating substantially synonymous actions 204 into the entity/action relationship matrix 120, implementations may provide for a richer view of the experiences and actions 204 of entities 202 in the manuscript 106 than may be provided in an absence of the ontological analysis. Moreover, the incorporation of substantially synonymous actions 204 may also provide for a more accurate application of framework rules to a manuscript 106, as described further below.

The schematic 200 includes an example row 208, providing an example of an entity 202 and a set of actions 204 associated with that entity 202. The examples of entities 202, frameworks, manuscripts 106, and other creative works described herein are not taken from actual works, and are not based on actual works. The first column of the example row 208 lists an entity 202, in this case a character named "Tom Walker" that is present in the manuscript 106. The example row 208 also includes three columns that each list an action 204 performed by or experienced by "Tom Walker": that he "fought bravely," "slept," and "is scared." Each of these actions 204 includes a position indicator 206 indicating a position in the manuscript 106 where the action 204 is described. The example row 208 also includes a fourth column describing an additional action 204 that is substantially synonymous with one or more of the other listed actions 204. In this example, the additional action 204 of "struggled bravely" has been added as a synonym of the "fought bravely" action. Such additional, substantially synonymous actions 204 may be added to the entity/action relationship matrix 120 through operations of the ontological analysis module 118. In some implementations, as in the example row 208, a substantially synonymous action 204 may include the position indicator 206 of the action 204 to which it is synonymous. Alternatively, a position indicator 206 may not be included in the substantially synonymous actions 204 added by the ontological analysis module 118. The actions 204 may include actions described in an active voice with the manuscript 106 (e.g., "Tom Walker painted the Chalice of Unspeakables") or actions 204 described in a passive voice (e.g., "The Chalice of Unspeakables was painted by Tom Walker"). Accordingly, the actions 204 may include actions 204 performed by the entity 202 as well as actions 204 performed on the entity 202.

In some implementations, the entity/action relationship matrix 120 may include entity metadata 210 associated with one or more of the entities 202. The entity metadata 210 may include any type of information that describes the entity 202. For example, in cases where the entity 202 is a character, the entity metadata 210 may describe the age, gender, appearance, or other characteristics of the character. As another example, in cases where the entity 202 is an object, the entity metadata 210 may describe the color, shape, size, or other characteristics of the object. The entity metadata 210 may also describe a relationship between entities 202. For example, the entity metadata 210 may indicate that a first entity 202(1) is a brother, sister, parent, or child of a second entity 202(2). As another example, the entity metadata 210 may indicate that a first entity 202(1) is an object that is owned by or otherwise associated with a second entity 202(2) that is a character. The entity metadata 210 may describe the existence and the nature of any type of relationship between any number of entities 202.

Although FIG. 2 depicts the entity/action relationship matrix 120 in a particular configuration as a two-dimensional matrix, implementations are not limited to this configuration. Implementations support an entity/action relationship matrix 120 having any number of dimensions, and including additional or less information than shown in the example. In some implementations, the position indicators 206 or the entity metadata 210 may be arranged as another dimension of the entity/action relationship matrix 120. For example, in some implementations the entity/action relationship matrix 120 may include an identification of the manuscript 106 for which it was generated. Such identification may include a name of the manuscript 106, its author, an identifier number that uniquely identifies the manuscript 106, or other information that identifies or describes the manuscript 106. Implementations are not limited to employing an entity/action relationship matrix 120 of any particular structure or format.

Returning to FIG. 1, the manuscript analysis module 114 may store the entity/action relationship matrix 120 in memory on the analysis server device(s) 112 or elsewhere, and the entity/action relationship matrix 120 may be made available for further operations to analyze the manuscript 106. The entity/action relationship matrix 120 may also be communicated to one or more devices, processes, or users. In some cases, the entity/action relationship matrix 120 for a manuscript 106 may be employed to determine whether the manuscript 106 is to be published. Such a determination may be made manually, such as by one or more reviewers, editors, publishers, or other users. The determination may also be at least partly automated, in that one or more processes may be configured to access the entity/action relationship matrix 120 and perform further analysis of the information included therein.

In some implementations, the analysis server device(s) 112 may execute a framework rules application module 122. In cases where the manuscript 106 is associated with a framework identified by the framework identifier 108, the framework rules application module 122 may perform operations to determine whether the manuscript 106 complies with one or more rules governing the use of entities 202 in the framework or more generally governing the use of the framework. Such rules may be included in framework rules data 124. The framework rules application module 122 may access the entity/action relationship matrix 120 and the framework rules data 124, and apply to the entity/action relationship matrix 120 one or more rules included in the framework rules data 124. The framework rules application module 122 may generate rules application result data 126, describing the results of applying the one or more rules to the entity/action relationship matrix 120. The rules application result data 126 may indicate whether the manuscript 106 substantially complies or does not comply with the one or more of the rules included in the framework rules data 124. Operations of the framework rules application module 122 are described further with reference to FIG. 8.

Figure 3:
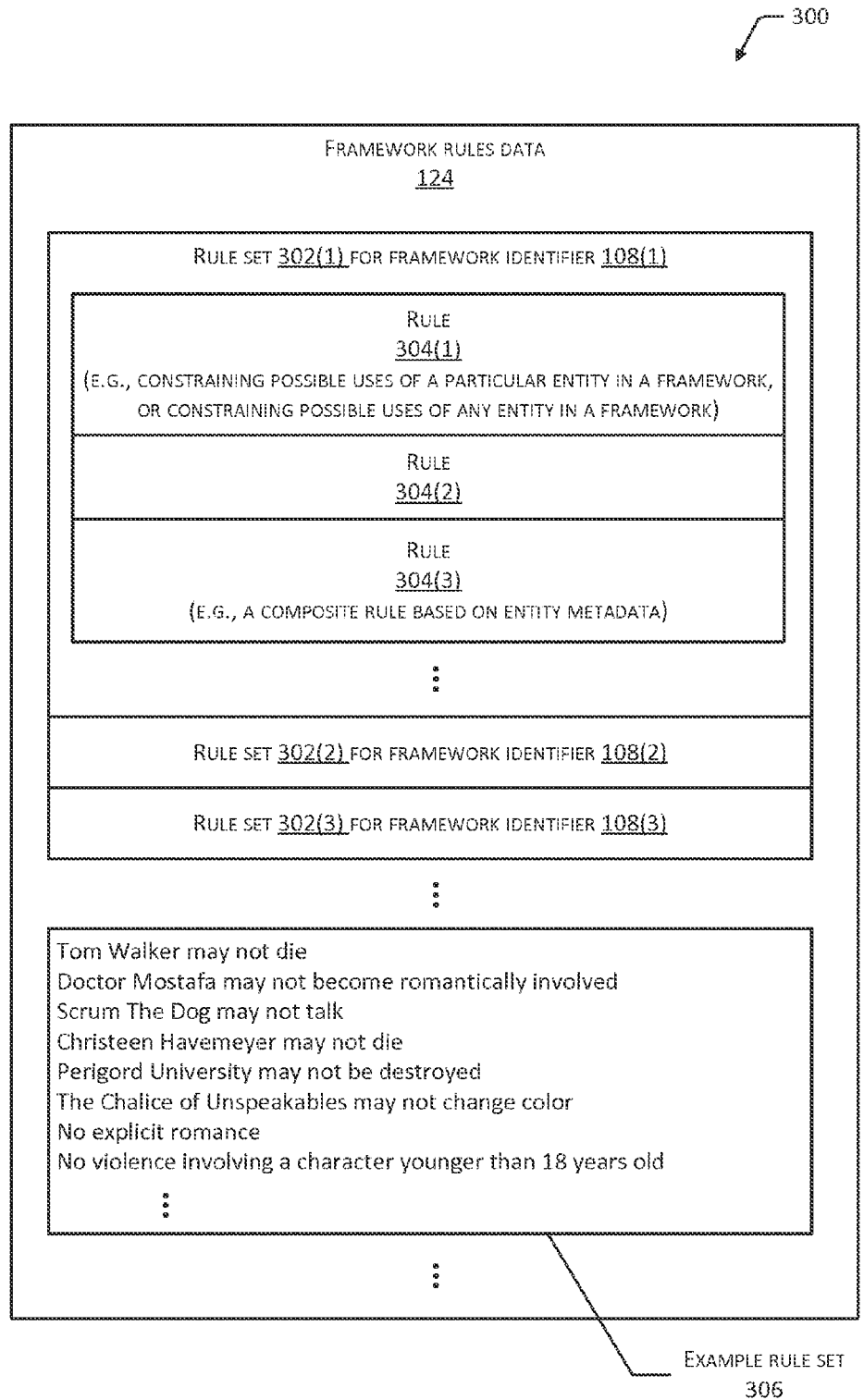
FIG. 3 depicts a schematic of example framework rules data, including one or more rules that constrain the use of framework entities in a manuscript, or that constrain the use of the framework.

FIG. 3 depicts a schematic 300 of an example of the framework rules data 124, including one or more rules that constrain the use of framework entities in the manuscript 106. As shown in the example of FIG. 3, the framework rules data 124 may include one or more rule sets 302 that each correspond to a framework identified by a framework identifier 108. Accordingly, in some implementations the rule set 302 may include the framework identifier 108 that identifies the corresponding framework. The rule set 302 may include one or more rules 304 that govern the use of the framework in newly created works that are set in the framework or otherwise derived from the framework. The framework rules data 124 may include any number of rule sets 302, and each rule set 302 may include any number of rules 304.

As described above, the rule set 302 governing the use of a framework may have been determined by an author 104, publisher, or other owner of rights to the framework. As such, the rule set 302 for a framework may have been agreed to in a contract between the rights owner and operators of a direct publishing or self-publishing service supported through operations of the publishing server device(s) 102. In some cases, the author(s) 104 may agree to comply with the rule set 302 when they submit a manuscript 106 associated with the framework. For example, the author 104 of a manuscript 106 set in the "Tom Walker" world may agree to a set of rules that constrain the use of the "Tom Walker" world and its entities, and the set of rules may have been determined by one or more parties who own the copyright to the "Tom Walker" world. The framework rules application module 122 may perform operations to determine whether the author(s) 104 have complied with the rule(s) 304 included in the rule set 302 for a framework.

In some cases, non-compliance with the rule(s) 304 may include notifying one or more users (e.g., content editors or manuscript reviewers) that the manuscript 106 is non-compliant, where such notification includes an indication of a location within the manuscript 106 where the non-compliance is exhibited. The notification may enable a manual examination of the manuscript 106 to determine whether it is actually non-compliant with the rule(s) 304. In some cases, non-compliance with the rule(s) 304 may lead to a submitted manuscript 106 being automatically rejected or otherwise barred from publication, pending a manual examination or pending edits by the author(s) 104 to bring the manuscript 106 into compliance. Non-compliance with the rule(s) 304 may also lead to a notification that is sent to inform the author 104 that a submitted manuscript 106 does not comply with the rule(s) 304. In such cases, the notification may indicate the particular rule(s) 304 with which the manuscript 106 is non-compliant.

In the example of FIG. 3, the framework rules data 124 includes an example rule set 306. The example rule set 306 includes a set of rules 304 governing the use of a framework related to a "Tom Walker" series of books that were previously published. Accordingly, the example rule set 306 includes rules 304 that in some way constrain the use of entities 202 that were previously established within the "Tom Walker" framework. The example rule set 306 includes rules governing the use of characters from the framework, such as "Tom Walker may not die," "Doctor Mostafa may not become romantically involved," "Scrum the Dog may not talk," and "Christeen Havemeyer may not die." The example rule set 306 also includes rules 304 governing the use of locations or objects (e.g., named objects) from the framework, such as "Perigord University may not be destroyed," and "The Chalice of Unspeakables may not change color." The rules 304 may also include rules governing the interaction or relationship of two or more characters, objects, or locations. The example rule set 306 may also include rules 304 that govern the use of the framework more broadly, and that are not specific to particular characters. For example, the example rule set 306 includes a rule "no explicit romance," indicating that explicitly romantic or prurient situations are not to be allowed in manuscripts 106 that are set in the framework. Implementations are not limited to the particular examples of rules 304 described herein.

In some implementations, the rule set 302 may include one or more rules 304 that are composite or multi-tiered rules, as illustrated by rule 304(3). Such composite rules 304 may include rules that are based on the entity metadata 210, e.g., based on a description or characteristic of an entity 202. The composite rules 304 may constrain the use of an entity 202 according to characteristics included in the entity metadata 210. For example, as shown in the example rule set 306, a composite rule 304 may include a rule that the manuscript 106 may not include any violence that involves a character younger than 18 years old. When determining whether the manuscript 106 complies with such a rule 304, implementations may analyze each of the entities 202 for which the entity metadata 210 indicates an age less than 18 years old, or indicates that the entity 202 is not an adult. Implementations may then analyze each of the action(s) 204 associated with the entities 202 who are younger than 18 years old, and determine whether the action(s) 204 indicate any violence associated with the entities 202. If violent action(s) 204 are associated with the entities 202, a determination may be made that the manuscript 106 violates the composite rule 304. As another example, the rule set 302 may include a composite rule 304 barring romantic involvement between characters for which the entity metadata 210 indicates a certain type of familial relationship (e.g., sibling or parent-child relationships), or barring the romantic involvement of an entity 202 younger than a particular age.

Returning to FIG. 1, in some implementations the analysis server device(s) 112 may execute a framework entity analysis module 128. In cases where the manuscript 106 is associated with a framework identified by the framework identifier 108, the framework entity analysis module 128 may perform operations to determine whether the manuscript 106 includes one or more entities 202 from other frameworks (e.g., cross-over entities), or whether the manuscript 106 includes higher than a threshold proportion of entities that are not associated with the framework identified by the framework identifier 108. To perform such an analysis, the framework entity analysis module 128 may access the entity/action relationship matrix 120 and framework entity data 130, where the framework entity data 130 lists a set of entities that are associated with one or more frameworks. The framework entity analysis module 128 may generate entity analysis result data 132, describing the results of its analysis. The entity analysis result data 132 may indicate whether the manuscript 106 includes cross-over entities from other frameworks, or whether the manuscript 106 includes higher than a threshold proportion of entities that are not from the framework identified by the framework identifier 108. Operations of the framework entity analysis module 128 are described further with reference to FIGS. 9 and 10.

Figure 4:
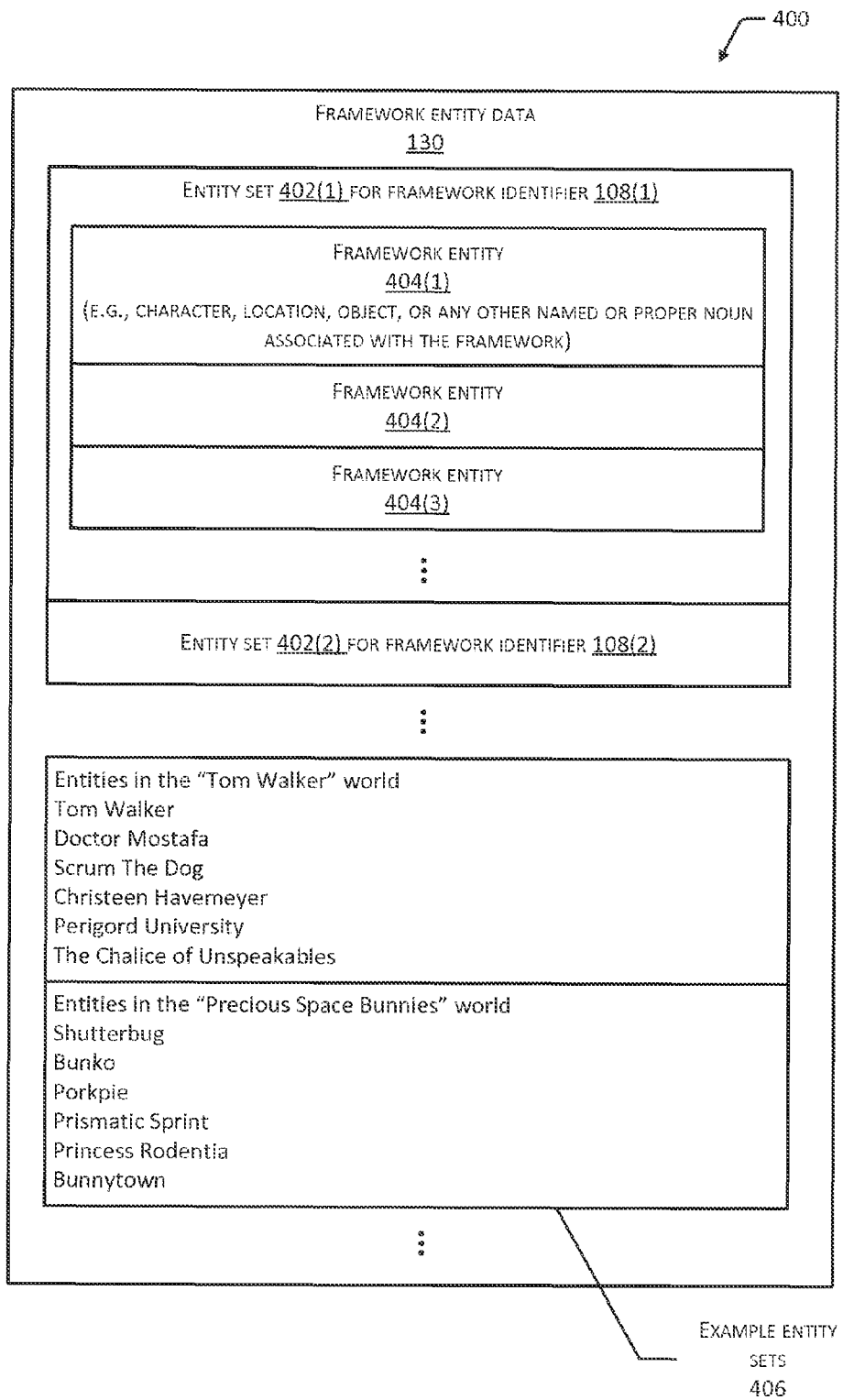
FIG. 4 depicts a schematic of example framework entity data that describes one or more entities associated with one or more frameworks.

FIG. 4 depicts a schematic 400 of an example of the framework entity data 130. As shown in the schematic 400, the framework entity data 130 may include any number of entity sets 402 that each correspond to a framework identified by a framework identifier 108. Accordingly, in some cases the entity set 402 may include the framework identifier 108 that identifies its corresponding framework. Each of the entity sets 402 may include a list of any number of entities that were previously established within the framework, or that are otherwise associated with the framework. As described above, the framework entities 404 for a framework may include any number of characters, objects, or locations that were originally presented in at least one work within the framework. The framework entities 404 may also include concepts or ideas that are named or otherwise particularly described in at least one work within the framework. In some implementations, the framework entities 404 may include any proper noun that is described within at least one work set within the framework. In some cases, the framework entities 404 included in an entity set 402 corresponding to a framework may have been previously curated, either automatically or manually, and stored in the framework entity data 130.

In the example of FIG. 4, the framework entity data 130 includes two example entity sets 406. The first example entity set 406 lists entities from the "Tom Walker" world or framework, including characters such as "Tom Walker," "Doctor Mostafa," "Scrum the Dog," and "Christeen Havemeyer." The example entity set also includes locations or objects from the "Tom Walker" world, such as "Perigord University," and "The Chalice of Unspeakables." The second example entity set lists entities from the "Precious Space Bunnies" world or framework, including characters such as "Shutterbug," "Bunko," "Porkpie," and "Princess Rodentia." The example entity set also includes locations or objects such as "Prismatic Sprint," and "Bunnytown." In some implementations, a manuscript 106 may be barred from publication is it purports to be set in a first framework, but includes entities associated with a second framework. For example, a manuscript 106 "Tom Walker and the Shadowy Prince" that purports to be set within the "Tom Walker" world may be rejected for publication if it includes one or more entities 202 from the "Precious Space Bunnies" world.

Returning to FIG. 1, although the manuscript analysis module 114, the framework rules application module 122, and the framework entity analysis module 128 are shown as executing on the analysis server device(s) 112, implementations are not so limited. In some implementations, one or more of the manuscript analysis module 114, the framework rules application module 122, or the framework entity analysis module 128 may execute on the publishing server device(s) 102 or elsewhere. In some implementations, at least some of the operations of the publishing server device(s) 102 and the analysis server device(s) 112 may be performed by a same computing device or set of computing devices. Moreover, although the storage device(s) 110 are depicted as external to the publishing server device(s) 102 and the analysis server device(s) 112, in some implementations at least a portion of the data stored on the storage device(s) 110 may be stored in memory on one or both of the publishing server device(s) 102 and the analysis server device(s) 112, or on other computing devices.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 5:
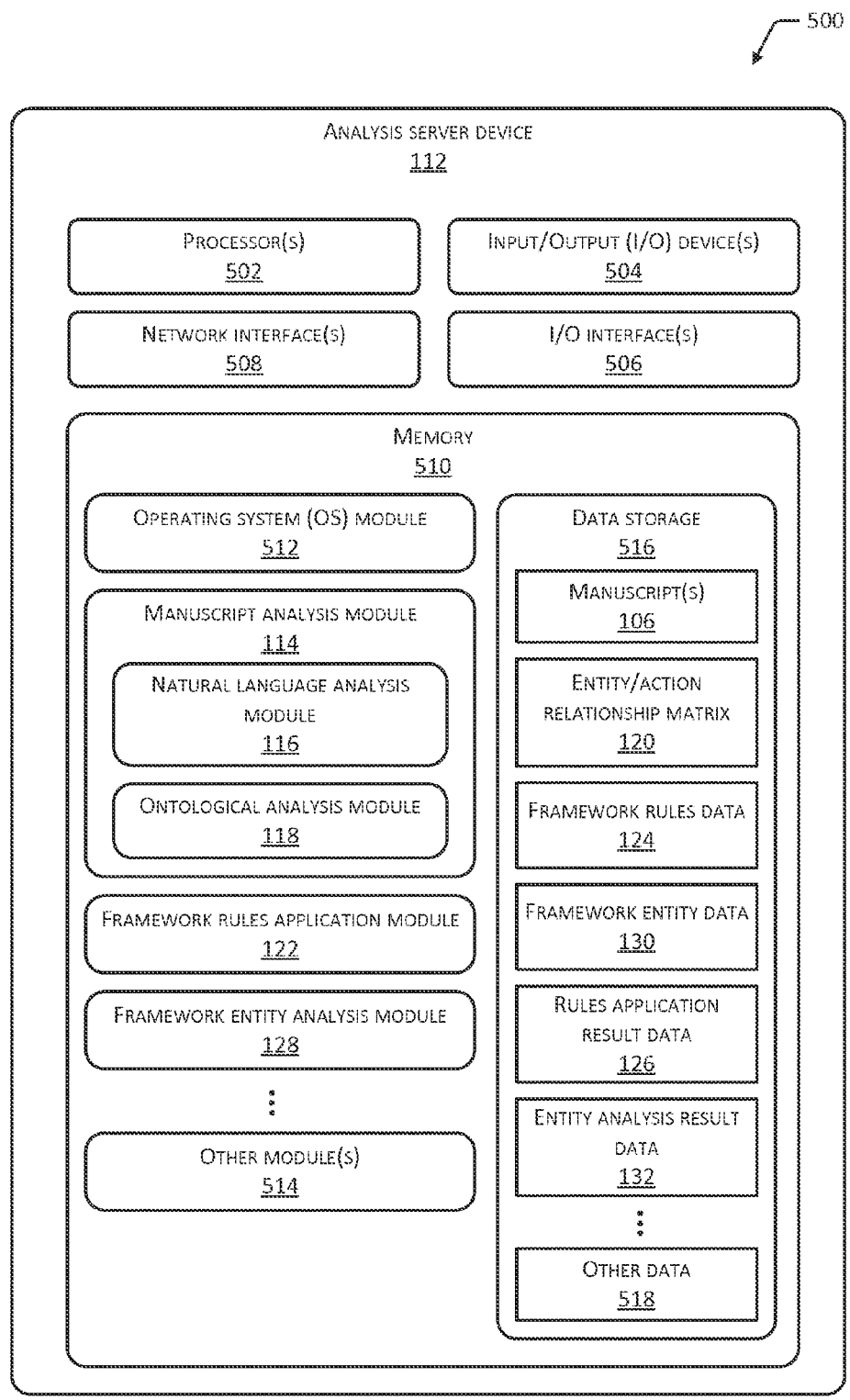
FIG. 5 depicts a block diagram of an example analysis server device configured to generate an entity/action relationship matrix for a submitted manuscript, and to employ the entity/action relationship matrix in analyzing the manuscript.

FIG. 5 depicts a block diagram 500 of an example of the analysis server device 112 that is configured to determine the entity/action relationship matrix 120 for the submitted manuscript 106, and to employ the entity/action relationship matrix 120 in analyzing the manuscript 106. As shown in the block diagram 500, the analysis server device 112 may include one or more processors 502 configured to execute one or more stored instructions. The processor(s) 502 may comprise one or more cores.

The analysis server device 112 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the analysis server device 112, or may be externally placed.

The analysis server device 112 may include one or more I/O interfaces 506 to enable components or modules of the analysis server device 112 to control, interface with, or otherwise communicate with the I/O device(s) 504. The I/O interface(s) 506 may enable information to be transferred in or out of the analysis server device 112, or between components of the analysis server device 112, through serial communication, parallel communication, or other types of communication. For example, the I/O interface(s) 506 may comply with a version of the RS-232 standard for serial ports, or with a version of the Institute of Electrical and Electronics Engineers (IEEE) 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The analysis server device 112 may also include one or more busses or other internal communications hardware or software that allow for the transfer of data between the various modules and components of the analysis server device 112.

The analysis server device 112 may include one or more network interfaces 508 that enable communications between the analysis server device 112 and other network accessible computing devices, such as the publishing server device(s) 102 or the storage device(s) 110. The network interface(s) 508 may include one or more network interface controllers (NICs) or other types of transceiver devices configured to send and receive communications over a network.

The analysis server device 112 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the analysis server device 112. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the following: any version of the Linux® operating system; any version of iOS™ from Apple® Corp. of Cupertino, Calif., USA; any version of Windows® or Windows Mobile from Microsoft™ Corp. of Redmond, Wash., USA; any version of Android® from Google™ Corp. of Mountain View, Calif., USA and its derivatives from various sources; any version of Palm OS® from Palm Computing, Inc. of Sunnyvale, Calif., USA and its derivatives from various sources; any version of BlackBerry OS from Research In Motion® Ltd. of Waterloo, Ontario, Canada; any version of VxWorks® from Wind River Systems of Alameda, Calif., USA; or other operating systems.

The memory 510 may include one or more of the modules described above as executing on the analysis server device 112, such as the manuscript analysis module 114, the natural language analysis module 116, the ontological analysis module 118, the framework rules application module 122, or the framework entity analysis module 128. Although the natural language analysis module 116 and the ontological analysis module 118 are depicted as sub-modules, sub-components, or sub-processes of the manuscript analysis module 114, in some implementations one or both of the natural language analysis module 116 or the ontological analysis module 118 may execute separately from the manuscript analysis module 114. The memory 510 may also include one or more other modules 514, such as a user authentication module or an access control module to secure access to the analysis server device 112, and so forth.

The memory 510 may include data storage 516 to store data for operations of the analysis server device 112. The data storage 516 may comprise a database, array, structured list, tree, or other data structure, and may be a relational or a non-relational datastore. The data storage 516 may store data such as that described above, including one or more of the manuscript(s) 106, the entity/action relationship matrix 120, the framework rules data 124, the framework entity data 130, the rules application result data 126, or the entity analysis result data 132. The data storage 516 may also store other data 518, such as user authentication information or access control data. In some implementations, at least a portion of the information stored in the data storage 516 may be stored externally to the analysis server device 112, on other devices that may communicate with the analysis server device 112 via the I/O interface(s) 506 or via the network interface(s) 508.

Figure 6:
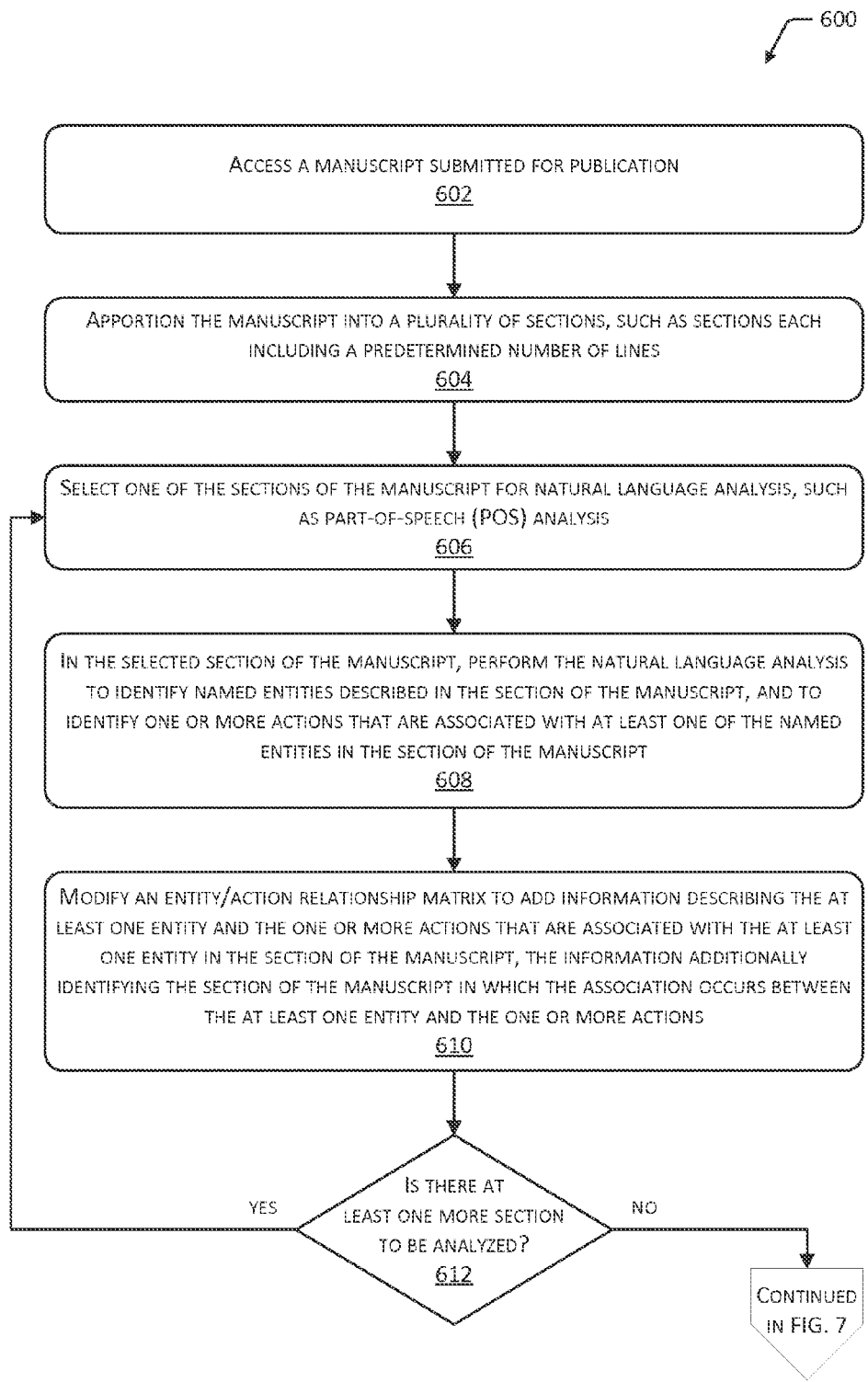
FIG. 6 depicts a flow diagram of a process for determining an entity/action relationship matrix for a manuscript.

FIG. 6 depicts a flow diagram 600 of a process for generating the entity/action relationship matrix 120 for the manuscript 106. One or more operations of the process may be performed by the manuscript analysis module 114, the natural language analysis module 116, or the ontological analysis module 118, or by other modules executing on the analysis server device(s) 112, the publishing server device(s) 102, or other devices.

At 602, the manuscript 106 may be accessed. As described above, in some cases the manuscript 106 may have been submitted to the publishing server device(s) 102 for publication as an eBook or in another format. In some implementations, the manuscript 106 may be accessed on its submission to the publishing server device(s) 102. Alternatively, the manuscript 106 may be accessed from the storage device 110.

At 604, in some implementations the manuscript 106 may be apportioned into a plurality of sections. Such apportioning may include logically apportioning the manuscript 106 into a plurality of sections within a single file that includes the submitted manuscript 106. Alternatively, the apportioning may include apportioning the manuscript 106 into multiple files. In some implementations, at least some of the sections may be of a predetermined size or amount of data, and implementations support the use of any size of the sections. In some cases, the sections may be a predetermined number of lines of the manuscript 106, such as ten lines. In some implementations, the sections may be variable in size. For example, the sections may correspond to chapters, paragraphs, sentences, or other grammatical, syntactic, or semantic divisions within the manuscript 106.

At 606, one of the sections of the manuscript 106 may be selected for natural language analysis. At 608, in the selected section of the manuscript 106, the natural language analysis may be performed to identify any entities 202 that are described in that section of the manuscript 106. In some implementations, pronouns or other anaphoric references may be resolved to determine the entity 202 that is referred to by the pronoun. For example, a sentence in which the noun is "he" may be determined, through an anaphoric analysis, to be proximal (e.g., within a predetermined number of sentences) to a reference to an entity 202 "Tom Walker," and an inference may be made that "he" refers to "Tom Walker." As part of the natural language analysis, one or more actions or events may be identified as associated with each of the identified entities 202. In some implementations, an action or event may be a verb or verb phrase that is determined by the natural language analysis to refer to an entity 202. An action 204 or event may also be an adjective or adjective phrase that describes or refers to the entity 202, as determined by the natural language analysis. In some cases, the inference that the verb, verb phrase, adjective, or adjective phrase refers to the entity 202 may be based on the entity 202 being within a same sentence, within the same section, or otherwise proximal to the verb, verb phrase, adjective, or adjective phrase.

At 610, the entity/action relationship matrix 120 may be modified to add information describing the at least one entity 202 identified at 608, and the one or more actions 204 identified at 608 as associated with each entity 202. In some cases, the entity 202 and action information may be added to an existing entity/action relationship matrix 120. Alternatively, the entity/action relationship matrix 120 may be created or otherwise initialized at 610. As described above, the entity/action relationship matrix 120 may list one or more entities 202 present in the manuscript 106, and may list zero or more actions 204 that are associated with each entity 202 in the manuscript 106. In some implementations, the entity/action relationship matrix 120 may also store information regarding the position 406 of each entity/action relationship (e.g., entity-to-action association) present in the manuscript 106. For example, the entity/action relationship matrix 120 may store a numeric value indicating which section includes a particular entity/action relationship, and the sections may correspond to those sections determined at 604. In some implementations, the entity metadata 210 for the entity 202 may also be incorporated into the entity/action relationship matrix 120 at 610.

At 612, a determination may be made whether there are additional sections of the manuscript 106 to be analyzed (e.g., whether the end of the manuscript 106 has been reached in the analysis). If so, the process may return to 606 and begin analyzing another section of the manuscript 106. If not, the process may continue as described with reference to FIG. 7.

Figure 7:
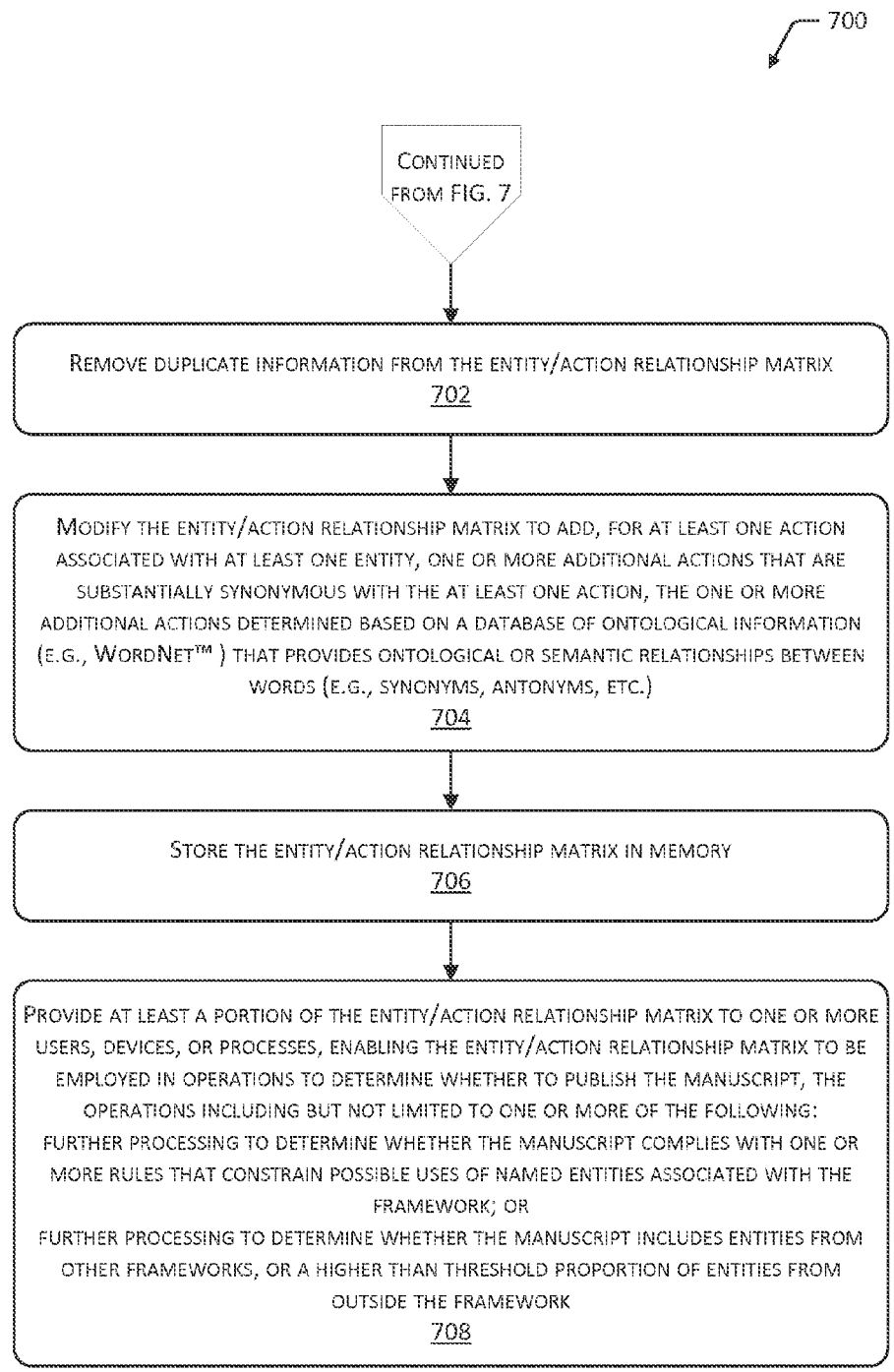
FIG. 7 depicts a flow diagram of a process for modifying an entity/action relationship matrix for a manuscript.

FIG. 7 depicts a flow diagram 700 of a process for modifying or further generating the entity/action relationship matrix 120 for the manuscript 106. One or more operations of the process may be performed by the manuscript analysis module 114, the natural language analysis module 116, or the ontological analysis module 118, or by other modules executing on the analysis server device(s) 112, the publishing server device(s) 102, or other devices.

At 702, duplicate information may be removed from the entity/action relationship matrix 120 generated as described with reference to FIG. 6. Such duplicate information may include duplicate rows corresponding to a same entity. For example, the entity/action relationship matrix 120 may be generated with a row corresponding to an entity "Tom Walker," a row corresponding to an entity "Tom," and a row corresponding to an entity "Walker." In some implementations, the actions listed in each of these rows may be incorporated into the same row, and the repetitive, duplicate, or superfluous rows may be removed. In such cases, the retained row may be the row associated with the more descriptive description of the entity among the substantially duplicated rows (e.g., "Tom Walker" instead of "Tom" or "Walker"). In some implementations, duplicate actions within a row may also be removed or combined. For example, if the row corresponding to "Tom Walker" includes an action "fought bravely" with a position indicator of section 57, and another action "fought bravely" with a position indicator of section 103, these two actions may be combined into a single column that lists an action "fought bravely" at sections 57 and 103.

At 704, the entity/action relationship matrix 120 may be modified to incorporate, for at least one action associated with at least one entity, one or more additional actions that are substantially synonymous or otherwise ontologically related to the at least one action. For example, if a row includes a column describing an action "fought bravely," additional columns may be added to the row describing additional actions "fought valiantly," "struggled bravely," "vied courageously," and so forth. Such additional actions may be synonymous to the expanded action, substantially synonymous to the expanded action, or in some way ontologically related to the expanded action. In some cases, the ontologically related actions may be determined based on a curated database of words, the database including a collection of words and ontologically related words such as synonyms, antonyms, words with similar connotations, words with similar emotional indicators, and so forth. For example, implementations may employ the WordNet® database to determine one or more additional actions that are ontologically related to a particular action.

At 706, at least a portion of the entity/action relationship matrix 120 may be stored in the memory 510 on the analysis server device(s) 112 or elsewhere. In some cases, at least a portion of the entity/action relationship matrix 120 may be communicated to one or more users, processes, or devices for further analysis. At 708, at least a portion of the entity/action relationship matrix 120 may be provided to one or more users, devices, or processes, enabling a determination whether the manuscript 106 complies with one or more rules 304 for a framework, as described further with reference to FIG. 8. At least a portion of the entity/action relationship matrix 120 may be provided to one or more users, devices, or processes, enabling a determination whether the manuscript 106 includes entities from other frameworks (e.g., cross-over entities) or a higher than threshold proportion of entities that are not in the framework, as described further with reference to FIGS. 9 and 10.

Figure 8:
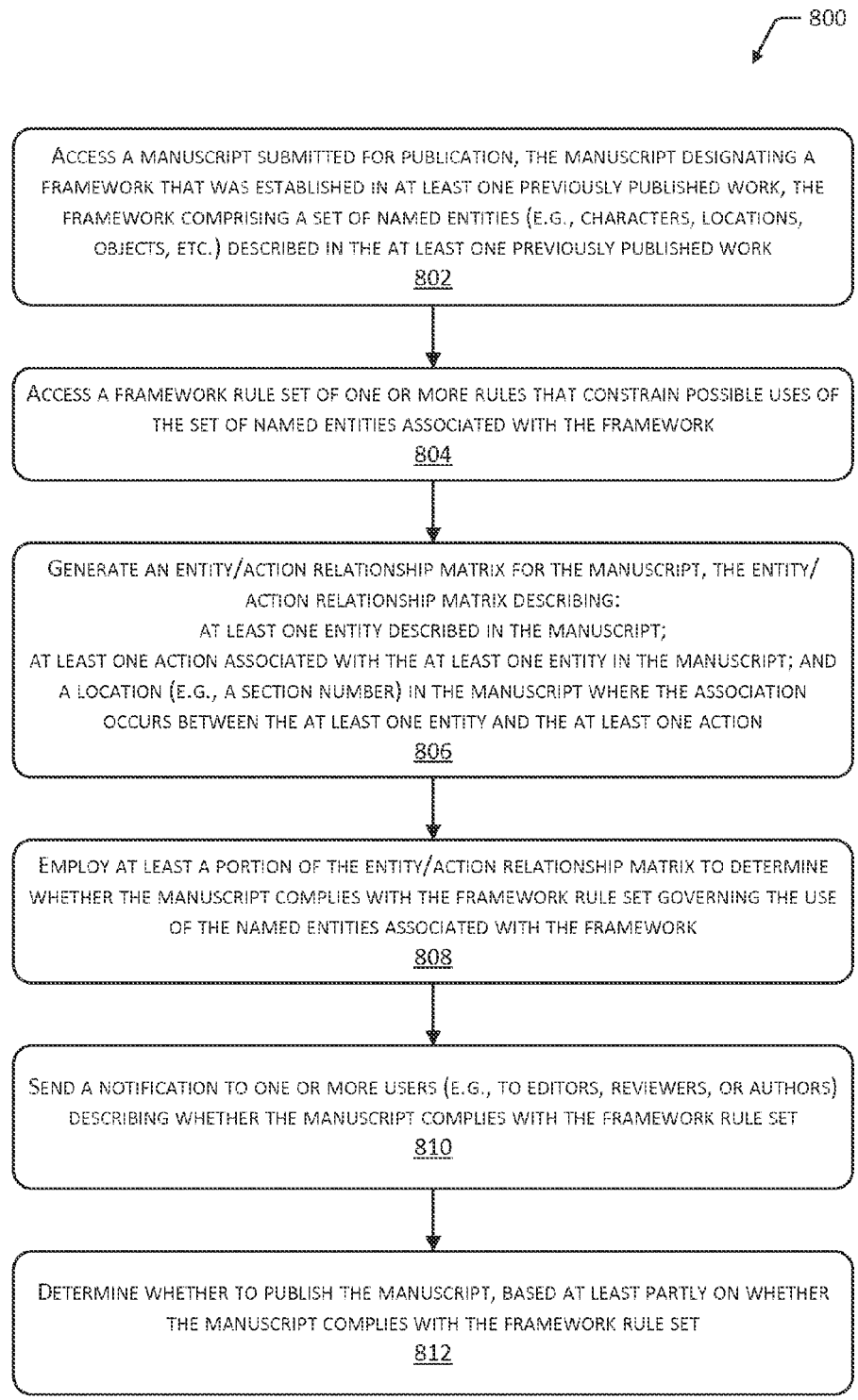
FIG. 8 depicts a flow diagram of a process for employing an entity/action relationship matrix to determine whether a manuscript complies with a set of rules constraining the use of framework entities in the manuscript, or constraining the use of a framework.

FIG. 8 depicts a flow diagram 800 of a process for employing the entity/action relationship matrix 120 to determine whether the manuscript 106 complies with a rule set 302 constraining the use of framework entities 404 in the manuscript 106. One or more operations of the process may be performed by the framework rules application module 122 or by other modules executing on the analysis server device(s) 112, the publishing server device(s) 102, or other devices.

At 802, the manuscript 106 is accessed as described with reference to 602. In some implementations, the manuscript 106 may include a framework identifier 108 identifying a framework within which the manuscript 106 is set or a framework that is otherwise associated with the framework. For example, an author 104 may submit a manuscript 106 for a book titled "Tom Walker and the Shadowy Prince," the book set within the "Tom Walker" world or framework that was established in one or more previously published "Tom Walker" works. Accordingly, the author 104 may have agreed to comply with a rule set 302 governing new works that are set within the "Tom Walker" framework.

At 804, the rule set 302 corresponding to the framework identified by the framework identifier 108 may be accessed. As described above with reference to FIG. 3, the rule set 302 may include any number of rules 304 constraining possible uses of the entities associated with the framework. The rule set 302 may also include any number of rules 304 constraining the use of the framework generally. For example, the rules 304 may indicate that there is to be no violence, no prurient interactions, or no use of the color green in the manuscript 106 set within the framework.

At 806, the entity/action relationship matrix 120 may be generated for the manuscript 106, as described above with reference to FIGS. 6 and 7. At 808, at least a portion of the entity/action relationship matrix 120 may be employed to determine whether the manuscript 106 complies with the rules 304 in the rule set 302 associated with the framework. In some implementations, this may include applying each of the rules 304 in the rule set 302 to each of the entity/action relationships described in the entity/action relationship matrix 120, to identify those entity/action relationships that do not comply with at least one of the rules 304. For example, if the rule set 302 includes a rule 304 that "Tom Walker may not die," the row corresponding to the entity "Tom Walker" in the entity/action relationship matrix 120 may be examined to determine whether the row includes any actions 204 for "dies," "is killed," "is deceased," "snuffs it," or any other actions 204 that are ontologically related to the concept of death. As another example, if the rule set 302 includes a rule 304 of "no violence" for works within the framework, each of the rows of the entity/action relationship matrix 120 may be examined to identify any actions 204 that are ontologically related to a concept of violence of any degree.

In some cases, multiple entity/action relationships in the entity/action relationship matrix 120 may be used to infer that the manuscript 106 is non-compliant with one or more rules 304. For example, the entity/action relationship matrix 120 may include a first entity/action relationship "Tom Walker fought bravely" and a second entity/action relationship "the Shadowy Prince struck the fatal blow," both at a same or nearby position (e.g., in a same section). Based on the proximity of the two relationships and their context, an inference may be made that the manuscript 106 is non-compliant with a rule "Tom Walker may not die," even though the manuscript 106 does not explicitly describe Tom Walker dying.

At 810, a notification including the rules application result data 126 may be sent to one or more users, indicating whether the manuscript 106 complies with the rules 304 as determined at 808. Such a notification may be sent to any number of users, such as the author(s) 104. The notification may also be sent to editors, reviewers, or other personnel who may determine whether to publish the manuscript 106 based on its compliance or non-compliance with the rules 304.

At 812, a determination may be made whether to publish the manuscript 106, based at least partly on whether the manuscript 106 complies with the rules 304 as determined at 808. In some cases, the rules application result data 126 may indicate an automatic decision whether to publish the manuscript 106 based on whether the manuscript 106 complies with the rules 304. In some cases, the rules application result data 126 may indicate zero or more positions (e.g., sections) within the manuscript 106 that are non-compliant with at least one rule 304, and may indicate the rule(s) 304 with which the manuscript 106 is non-compliant. Such information may then be employed by one or more users (e.g., editors or reviewers) to manually examine the manuscript 106 and determine whether it is actually non-compliant with one or more rules 304. Accordingly, the rules application result data 126 may include one or more warnings or alerts of possible non-compliance with the rules 304.

Figure 9:
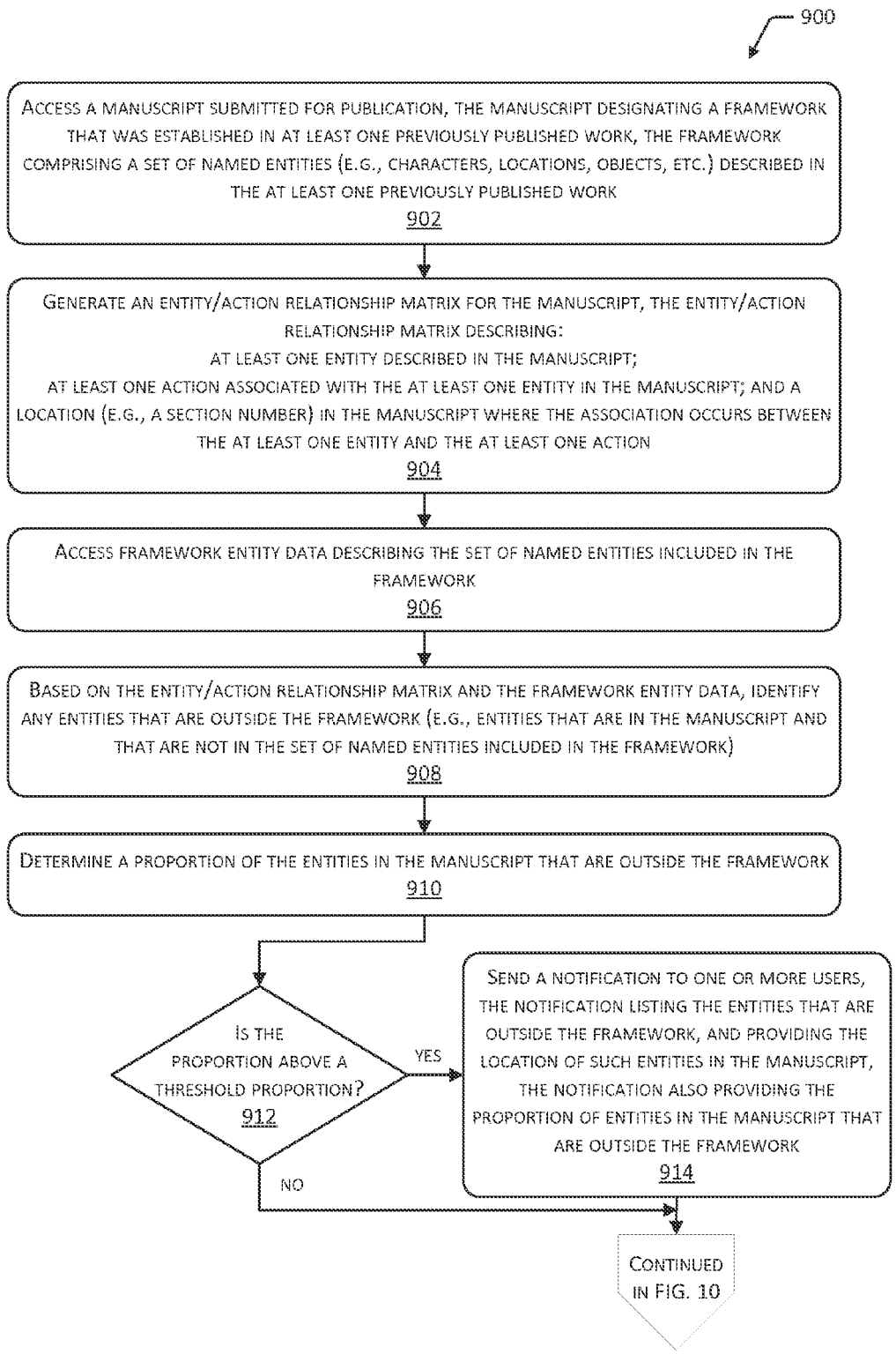
FIG. 9 depicts a flow diagram of a process for employing an entity/action relationship matrix to determine, in a manuscript that includes a plurality of entities, a proportion of those entities that are not included in a framework.

FIG. 9 depicts a flow diagram 900 of a process for employing the entity/action relationship matrix 120 to determine, in the manuscript 106 that includes a plurality of entities 202, a proportion of those entities 202 that are not included in a framework. One or more operations of the process may be performed by the framework entity analysis module 128 or by other modules executing on the analysis server device(s) 112, the publishing server device(s) 102, or other devices.

At 902, the manuscript 106 is accessed as described with reference to 602. As described above, the manuscript 106 may include a framework identifier 108 identifying a framework within which the manuscript 106 is set or a framework that is otherwise associated with the manuscript 106. At 904, the entity/action relationship matrix 120 may be generated for the manuscript 106, as described above with reference to FIGS. 6 and 7. At 906, the framework entity data 130 may be accessed, describing the entity set 402 corresponding to the framework identified by the framework identifier 108.

At 908, based on the entity/action relationship matrix 120 and the framework entity data 130, identification is made of any entities that are outside the framework, such as entities that are described in the manuscript 106 but that are not included in the entity set 402 for the framework. In some cases, this identification may include comparing each entity listed in the entity/action relationship matrix 120 to each of the framework entities 404 listed in the entity set 402 for the framework.

At 910, a calculation or other determination is made of a proportion of the entities 202 in the manuscript 106 that are not included in the entity set 402 for the framework, e.g., that are outside the framework. At 912, a determination may be made whether the proportion calculated at 910 is above a threshold proportion. If so, the process may proceed to 914.

At 914, a notification may be sent to one or more users such as editors, reviewers, the author(s) 104, or other personnel. The notification may include the entity analysis result data 132 describing the proportion of entities 202 in the manuscript 106 that are outside the framework, or describing the particular entities 202 in the manuscript 106 that are outside the framework. The threshold proportion may be predetermined, and in some cases may be indicated by the author, publisher, or other owner of rights to the framework. For example, the owner of rights to a framework may indicate that new works set within the framework are to include a set of entities 402 of which at least half are from the framework (e.g., such that the threshold proportion is 50%). If it is determined at 912 that the proportion is not above the threshold proportion, the process may proceed as described with reference to FIG. 10.

Figure 10:
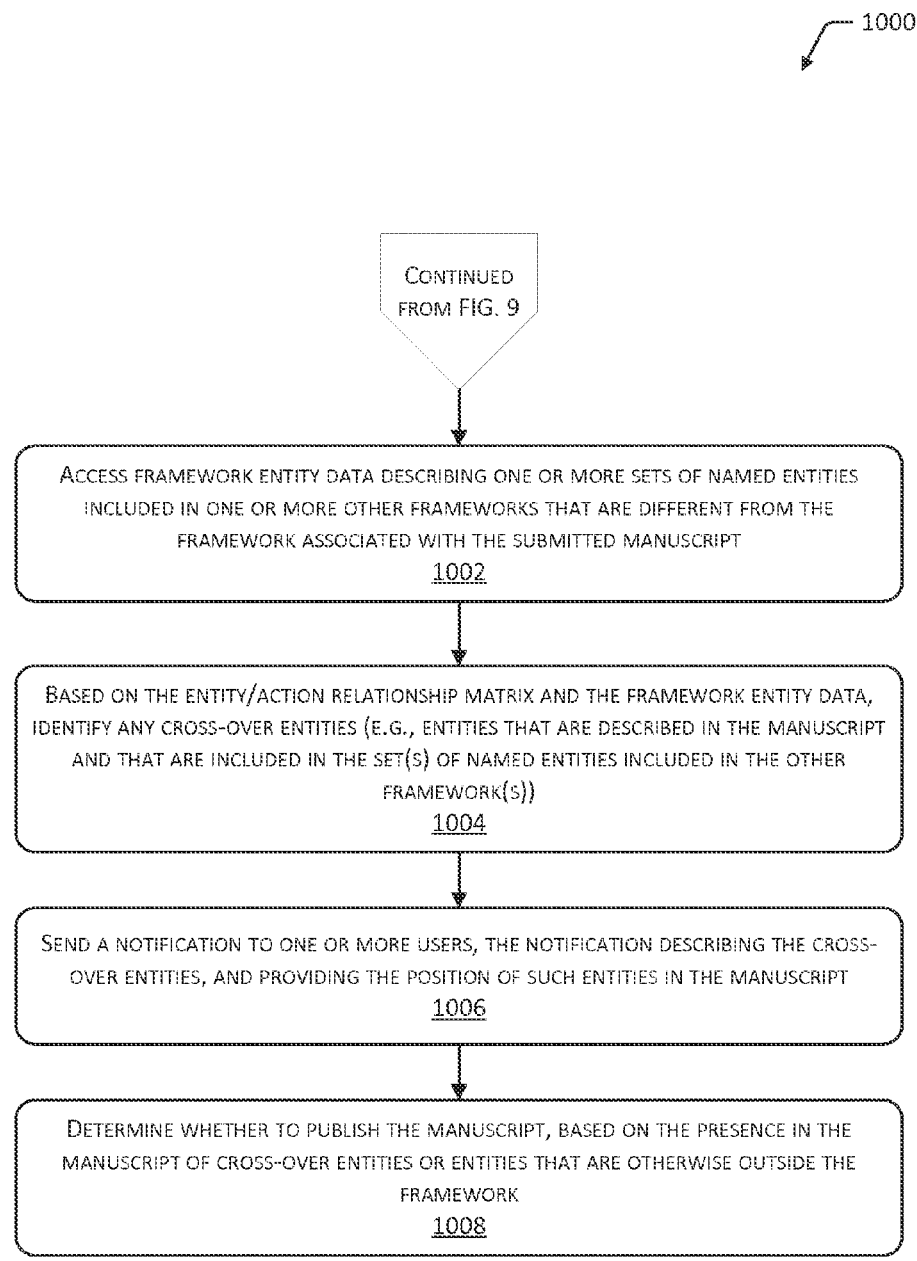
FIG. 10 depicts a flow diagram of a process for employing an entity/action relationship matrix to determine, in a manuscript that includes a plurality of entities, whether any of those entities are included in a framework other than the framework associated with the manuscript.

FIG. 10 depicts a flow diagram 1000 of a process for employing the entity/action relationship matrix 120 to determine, in the manuscript 106 that includes a plurality of entities 202, whether any of those entities 202 are included in a framework other than the framework associated with the manuscript 106. One or more operations of the process may be performed by the framework entity analysis module 128 or by other modules executing on the analysis server device(s) 112, the publishing server device(s) 102, or other devices.

At 1002, the framework entity data 130 may be accessed, describing the entity set 402 corresponding to one or more frameworks other than the framework identified by the framework identifier 108 of the manuscript 106.

At 1004, based on the entity/action relationship matrix 120 and the framework entity data 130, identification is made of any entities 202 that are cross-over entities, such as entities 202 that are described in the manuscript 106 but that are associated with frameworks other than the framework of the manuscript 106. In some cases, this identification may include comparing each entity 202 listed in the entity/action relationship matrix 120 to each of the framework entities 404 listed in the entity set 402 for the framework(s) other than the framework of the manuscript 106.

At 1006, a notification may be sent to one or more users such as editors, reviewers, the author(s) 104, or other personnel. The notification may include the entity analysis result data 132 describing the cross-over entities that were identified in the manuscript 106 based on the analysis at 1004. The notification may also provide the position (e.g., section number, page number, or paragraph number) of such cross-over entities within the manuscript 106.

At 1008, a determination may be made whether to publish the manuscript 106, the determination based on the presence (or absence) in the manuscript 106 of cross-over entities (as identified at 1004) or entities that are otherwise outside the framework (as identified at 908). In some cases, the presence of cross-over entities or outside entities in the manuscript 106 may lead to an automatic rejection of the manuscript 106 for publication. Alternatively, the entity analysis result data 132 may be sent to reviewers, editors, or other personnel, enabling such users to decide whether the inclusion of cross-over entities or outside entities merits rejection of the manuscript 106.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and may be encoded in one or more computer-readable storage media as instructions executable on one or more processors.

Embodiments may be provided as one or more computer program products that include one or more non-transitory computer readable storage media having stored thereon instructions (in compressed or uncompressed form) that may be used to program a computer (or other electronic device) to perform processes or methods described herein. The one or more computer readable storage media may include, but are not limited to, one or more of an electronic storage medium, a magnetic storage medium, an optical storage medium, a quantum storage medium, or a mechanical data storage medium. For example, the one or more computer readable storage media may include, but are not limited to, hard drives, floppy diskettes, optical disks, ROMs, RAMs, EPROMs, EEPROMs, flash memory, magnetic cards, optical cards, solid-state memory devices, or other types of physical media suitable for storing electronic instructions. Further, embodiments may also be provided as one or more computer program products including one or more transitory machine-readable signals in a compressed or an uncompressed form. Such machine-readable signals may or may not be modulated using a carrier. Examples of the machine-readable signals include, but are not limited to, signals that a computing system or other machine hosting or running a computer program may be configured to access. Machine-readable signals may include signals transmitted over one or more networks. For example, a transitory machine-readable signal may comprise transmission of software over a network such as the Internet.

Separate instances of the programs may be executed on or distributed across separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:

creating a framework from at least one previously published work, the framework comprising a first set of entities including one or more of a character, a location, or an object described in the at least one previously published work;

accessing a manuscript submitted for publication as an electronic book;

determining the manuscript is associated with the framework;

accessing one or more rules that constrain a first set of actions associated with the first set of entities within the framework, the first set of actions including one or more of a verb performed by or on at least one of the first set of entities in the framework or a phrase performed by or on the at least one of the first set of entities in the manuscript;

performing natural language analysis of the manuscript submitted for publication to identify a set of nouns described in the manuscript as a second set of entities and to identify a second set of actions that corresponds with the second set of entities by at least identifying a verb or phrase described in the manuscript that are performed by or on the second set of entities;

generating a set of relationships between the second set of entities described in the manuscript and the second set of actions described in the manuscript, such that the set of relationships further include one or more additional actions that are synonymous to at least one action associated with at least one entity in the second set of actions;

comparing the set of relationships between the second set of entities and the second set of actions associated with the second set of entities with the one or more rules that constrain the first set of actions associated with the first set of entities in the framework;

determining an amount of compliancy for each specific entity in the second set of entities by locating the one or more rules that reference the specific entity and determining whether the actions that correspond to the specific entity in the set of relationships comply or do not comply with the actions for the specific entity specified in the located one or more rules;

identifying the manuscript as compliant with the one or more rules based on determining that a number of actions of the second set of entities in the set of relationships that comply with the one or more rules is greater than a threshold proportion of a total number of the second set of entities; and generating result data that indicates the manuscript complies with the rules.

2. The method of claim 1, wherein the verb or phrase described in the manuscript includes one or more of:
   a verb performed by at least one of the second set of entities, as presented in the manuscript;
   a verb phrase performed by the at least one of the second set of entities, as presented in the manuscript;
   an adjective that describes the at least one of the second set of entities, as presented in the manuscript; or
   an adjective phrase that describes the at least one of the second set of entities, as presented in the manuscript.

3. The method of claim 1, further comprising:
   determining a proportion of the second set of entities that are not included in the first set of entities; and
   comparing the proportion to a threshold proportion.

4. The method of claim 1, further comprising:
   accessing a third set of entities included in one or more other frameworks that are different than the framework associated with the manuscript;
   determine a number of entities that are included in both the second set of entities and the third set of entities; and
   compare the number of entities to a threshold.

5. A system, comprising:
   at least one memory storing computer-executable instructions; and
   at least one processor in communication with the at least one memory, the at least one processor configured to access the at least one memory and execute the computer-executable instructions to:
      create a framework from at least one previously published work, the framework comprising a first set of entities and one or more rules that constrain a first set of actions associated with the first set of entities within the framework, the first set of actions including one or more of a verb performed by or on at least one of the first set of entities in the framework or a phrase performed by or on the at least one of the first set of entities in the manuscript;
      access a manuscript submitted for publication;
      determine the manuscript is associated with the framework;
      perform natural language analysis of the manuscript submitted for publication to identify a set of nouns described in the manuscript as a second set of entities described in the manuscript, and to identify a second set of actions that corresponds with the second set of entities by at least identifying a verb or phrase described in the manuscript that are performed by or on the second set of entities;
      generate a set of relationships between the second set of entities and the second set of actions, such that the set of relationships further include one or more additional actions that are synonymous to at least one action associated with at least one entity in the second set of actions;
      determine an amount of compliancy for each specific entity in the second set of entities by locating the one or more rules that reference the specific entity and determining whether the actions that correspond to the specific entity in the set of relationships comply or do not comply with the actions for the specific entity specified in the located one or more rules;
      identify the manuscript as compliant with the one or more rules based on determining that a number of actions of the second set of entities in the set of relationships that comply with the one or more rules is greater than a threshold proportion of a total number of the second set of entities; and
      generate result data that indicates the manuscript complies with the rules.

6. The system of claim 5, wherein the at least one processor is further configured to:
   create an additional relationship, wherein the additional relationship corresponds to an additional action that is substantially synonymous with a first action of the set of actions.

7. The system of claim 5, wherein the first set of entities includes one or more of a character, a location, or an object described in the manuscript.

8. The system of claim 5, wherein the at least one processor is further configured to:
   determine whether to publish the manuscript, based at least partly on the determining of the set of relationships in the manuscript between the second set of entities comply with the one or more rules of the framework.

9. The system of claim 5, wherein the one or more rules constrain uses, in the manuscript associated with the framework, of one or more of the second set of entities.

10. The system of claim 5, wherein:
    the at least one processor is further configured to generate a matrix that describes the set of relationships; and
    the matrix is employed in the determining the set of relationships in the manuscript between the second set of entities and the second set of actions associated with the second set of entities comply with the one or more rules of the framework.

11. The system of claim 5, wherein the at least one processor is further configured to:
    determine a proportion of the second set of entities that are not included in the framework; and
    compare the proportion to a threshold proportion.

12. The system of claim 5, wherein the at least one processor is further configured to:
    determine a third set of entities included in one or more other frameworks that are different than the framework associated with the manuscript;
    determine a number of entities that are included in both the second set of entities and the third set of entities; and
    compare the number of entities to a threshold.

13. The system of claim 5, wherein the at least one processor is further configured to:
    determine a position in the manuscript for each of one or more relationships in the set of relationships.

14. One or more non-transitory computer-readable media storing instructions which, when executed by at least one processor, instruct the at least one processor to perform actions comprising:

accessing a framework from at least one previously published work, the framework comprising a first set of entities;

accessing one or more rules that constrain a first set of actions associated with the first set of entities within the framework, the first set of actions including one or more of a verb performed by or on at least one of the first set of entities in the framework or a phrase performed by or on the at least one of the first set of entities in the manuscript;

accessing a manuscript submitted for publication, the manuscript being associated with the framework;

performing natural language analysis of the manuscript submitted for publication to identify a set of nouns described in the manuscript as a second set of entities described in the manuscript, and to identify a second set of actions associated with at least one of conveying an action associated with the first set of entities in the manuscript, the second set of actions including the one or more of a verb performed by or on at least one of the second set of entities in the manuscript or a phrase performed by or on the at least one of the second set of entities in the manuscript;

generating a set of relationships in the manuscript between the second set of entities and the second set of actions, such that the set of relationships further include one or more additional actions that are synonymous to at least one action associated with at least one entity in the second set of actions;

comparing the set of relationships between the second set of entities and the second set of actions associated with the second set of entities with the one or more rules that constrain the first set of actions associated with the first set of entities in the framework;

determining an amount of compliancy for each specific entity in the second set of entities by locating the one or more rules that reference the specific entity and determining whether the actions that correspond to the specific entity in the set of relationships comply or do not comply with the actions for the specific entity specified in the located one or more rules; and identifying the manuscript as compliant with the one or more rules based on determining that a number of actions of the second set of entities in the set of relationships that comply with the one or more rules is greater than a threshold proportion of a total number of the second set of entities; and generating result data that indicates the manuscript complies with the rules.

15. The one or more computer-readable media of claim 14, the actions further comprising:

creating an additional relationship in the set of relationships, wherein the additional relationship corresponds to an additional action that is substantially synonymous with a first action of the first set of actions.

16. The one or more computer-readable media of claim 14, wherein:

the first set of entities includes one or more of a character, a location, or an object described in the manuscript.

17. The one or more computer-readable media of claim 16, the actions further comprising:

determining a proportion of the second set of entities in the manuscript that are not included in the first set of entities of the framework; and comparing the proportion to a threshold proportion.

18. The one or more computer-readable media of claim 16, the actions further comprising:

determining a third set of entities included in one or more other frameworks that are different than the framework associated with the manuscript;

determining a number of entities that are included in both the first set of entities and the third set of entities; and comparing the number of entities to a threshold.

19. The one or more computer-readable media of claim 14, wherein:

the at least one processor is further configured to generate a matrix that describes the set of relationships; and the matrix is employed in the determining the set of relationships in the manuscript between the second set of entities and the second set of actions associated with the second set of entities complies with the set of rules.

20. The one or more computer-readable media of claim 14, the actions further comprising:

determining a position in the manuscript for each of one or more relationships in the set of relationships.

* * * * *